INVENTOR
Richard C. Ihde
BY
Wood, Herron & Evans
ATTORNEYS

United States Patent Office 3,594,464
Patented July 20, 1971

3,594,464
METHOD FOR SCORING SYNTHETIC PLASTIC SHEET MATERIAL
Richard C. Ihde, Parma Heights, Ohio, assignor to U.S. Plywood-Champion Papers Inc., Hamilton, Ohio
Filed Jan. 31, 1968, Ser. No. 702,082
Int. Cl. B29c 1/14, 17/02
U.S. Cl. 264—163                                    12 Claims

ABSTRACT OF THE DISCLOSURE

A process for scoring synthetic plastic sheet material by permanently distorting the sheet material in an area defining a score line or lines to form the scored sheet. The sheet material is also shaped in peripheral areas by cutting through its thickness to form a scored blank useful for fabricating containers and the like.

BACKGROUND OF THE INVENTION

Basically, two methods have been proposed for scoring semi-rigid synthetic plastic sheet material. According to one method, a platen or die member having an unbroken surface is adapted to cooperate with a scoring rule member. During score-forming, a sheet of plastic material is interposed between these members and then they are moved together to force the plastic material between the platen and the scoring rules thereby thinning the plastic in those areas. This is commonly called hinging—the hinges are characteristically easy to fold and capable of multiple flexing, i.e. have fatigue resistance. In another method, the platen is provided with a slot defining the score to be formed in the plastic sheet material which cooperates with a male scoring rule during score-forming. In this latter method, the male scoring rule is moved into the female slot with the sheet material positioned therebetween to cause the plastic sheet material to be scored by the score-forming action of the male and female members.

Both of the proposed methods have proved unsatisfactory for a number of reasons. In the first mentioned method, the score is formed by thinning the plastic material in the area between the scoring rules and platen member. The excess plastic material is pushed off to both sides of the scoring rule and is pushed into the unscored areas of the sheet. As a result, the scored plastic sheet instead of laying flat has a series of bubbles between the score lines. Bubbled, scored sheet material has the disadvantage of not lending itself to efficient stacking or packaging. Moreover, and importantly, stretching or bubbling the plastic material in the unscored areas elongates the sheet material laterally and longitudinally which tends to mitigate any attempt to achieve precise dimensional tolerances in the scored sheet.

Dimensional uniformity and precision in the production of scored and cut blanks are essential. This is demonstarted, for example, in the production of blanks for containers such as milk cartons. The dimensional tolerances in synthetic plastic sheet blanks for the production of milk containers in high speed machinery is on the order of ±0.005 inch. According to the mentioned prior art methods, plastic blanks are only capable of being made with dimensional tolerances on the order of about ±0.030. This has been proved intolerable in high speed precision machinery. Lack of dimensional precision in the blank results in inefficient machine operation. Blanks out of tolerance with the machine parts frequently jam up the machine or result in the formation of an undesirably packaged product. For example, lack of dimensional uniformity in the scored blank produces a packaged container where sealing is inadequately effected or where the level of the contents cannot uniformly be maintained between containers. Also blanks are usually made separately and shipped to the place of use. A relatively flat, unbubbled blank is needed to facilitate packaging for shipment.

The second mentioned prior art technique, while tending to provide better control over the depth of scores than the first mentioned method, still produces a bubbled, non-flat blank. In short, neither of these methods or apparatus have been found suitable for the production of scored synthetic plastic sheet material which is adaptable for use in high speed machinery for producing containers or cartons. There is a need for a process and apparatus for scoring synthetic plastic sheet material without the production of bubbles or blisters between the score lines and the associated disadvantages.

SUMMARY OF THE INVENTION

This invention is directed to a process for forming a score line of predetermined configuration in synthetic plastic sheet material which results in a well-defined score without bubbling or stretching the sheet material in the unscored areas. The process according to this invention includes immobilizing the sheet material in those areas bordering the sides of the sheet area defining the score line and locally stretching the sheet material in the area defining the score line while substantially maintaining the sheet material in the immobilized areas against stretching. This process produces a flat, scored blank with overall dimensional tolerances uniformly maintained within a precision of about ±0.005 inch. The scored and cut blanks of plastic sheet provided according to this invention have been found especially suitable for use in high speed, precision machinery for the production of cartons such as milk containers.

In a preferred form, the process according to this invention includes providing male and female die members movable into and out of score-forming relation with one another by suitable means. The male member has a scoring rule and a resilient material substantially surrounding the rule and extending above the scoring end of the rule. The resilient material has sufficient resiliency for compression below the rule end when the members are brought into score-forming relation. The female member has a surface with a slot for receiving the rule during score-forming. The female slot terminates in a bottom at a predetermined depth and the scoring rule end cooperates with the slot bottom during score-forming to press the plastic sheet material therebetween. A plastic sheet material is scored by interposing it between the die members and then moving the members into score-forming relation to cause the resilient material to frictionally engage and sufficiently immobilize the plastic sheet material under compression against the female surface in those areas bordering the slot. The scoring rule is then introduced into the slot to stretch the sheet material thereinto while substantially maintaining the sheet material in the immobilized areas against stretching to score the plastic sheet. During scoring, the end of the scoring rule and female slot bottom cooperate to restrain the stretched plastic material therebetween. The members are then separated to recover the scored sheet.

In the preferred form just described, the plastic sheet is locally stretched and oriented into the female slot and then the scoring rule end cooperates with the slot bottom to contact or press the plastic therebetween. This particular score-forming cooperation of the male rule end with the female bottom is sometimes conveniently referred to in the description of this invention as the "bottom technique." An alternative embodiment of this invention is herein referred to as the "bottomless technique." The term "bottomless technique" applies to the score-forming cooperation of the male and female members where the plastic material is not pressed or contacted between the male rule end and the bottom of the female slot. Both of these techniques have in common the formation of a well-defined score in synthetic plastic sheet without bubbling or stretching the sheet material in the unscored areas. Also, in both of these techniques scoring is accomplished by immobilizing the sheet material in those areas bordering the sides of the sheet area defining the score line and locally stretching the sheet material in the area defining the score line while substantially maintaining the sheet material in the immobilized areas against stretching.

The bottom technique is presently preferred over the bottomless technique for several reasons. First, score height is better controlled in the bottom technique. Second, it has been found that when the stretched and oriented plastic is contacted or pressed between the scoring rule and the female bottom, a sharper score line in the plastic is obtained. A sharper score line renders the sheet material more foldable. Third, the scored exterior of a blank (i.e., blank side formed adjacent the female slot) can be more readily shaped by the bottom technique so as to prevent its nesting with the second interior (i.e., the blank side formed adjacent the male rule) of another blank when they are stacked. The elimination of nesting or sticking of stacked scored blanks is a particular advantage because blanks are usually supplied individually from stacks into high speed precision machinery which sets each blank up into a carton. If blanks stick together, serious problems are encountered in operating the precision machinery.

When scoring and cutting a blank according to this invention, the male member also has a cutting blade which cuts the sheet material when the male and female members are moved into score-forming relation. Preferably, the resilient material of the male member also extends above the cutting edge of the blade to permit effective immobilization and cutting of the sheet material during score-forming.

It has been found that, when score-forming or score-forming and cutting a carton blank having multiple score lines according to this invention, the immobilization of the sheet material in the unscored areas between the areas defining the score lines or score lines and cuts should be substantially complete. This process produces a flat carton blank and maintains tolerances on the order of about ±0.005 inch. Moreover, this process produces a well-defined score which is oriented at its apex, due probably to the thinning action and partial orientation occurring during localized stretching, and this configuration folds, breaking along score lines readily and efficiently in setting up the carton. In addition, the flat scored blanks produced by this process can be easily stacked and packaged for transportation to the place of use.

Apparatus according to this invention includes means for immobilizing sheet material in those areas bordering the sides of a sheet area defining the score line and means for stretching the sheet material in the area defining the line. In a preferred form, the apparatus includes a female die member and a male scoring member movable relative to one another into and out of score-forming relation by suitable means. The female member has a surface wth a slot therein defining a score line for receiving the male scoring member during score-forming. The male scoring member has a scoring rule for locally stretching the sheet material into the female slot during score-forming. The apparatus also includes means for immobilizing the sheet material between the male and female members in those areas bordering the slot. Preferably, the male scoring member has a scoring rule and a resilient material substantially surrounding the rule and extending above the scoring end of the rule. This resilient material has sufficient resiliency for compression below the scoring end of the rule when the members are brought into score-forming relation. The resilient material is adapted to frictionally engage and immobilize the sheet material between the male and female members in those areas bordering the female slot during score-forming.

This invention permits scoring by pressure forming synthetic plastic sheet material of the semi-rigid polyolefin plastic type. Suitable polyolefin plastic material includes stock sheet material formed of an aliphatic polymer selected from the group consisting of polyethylene, polypropylene and the like. Polymeric compositions of this type conventionally sometimes include plasticizers, fillers and the like. Other synthetic plastic material includes polymers of vinyl aromatic compounds such as high impact biaxially oriented polystyrene and the like which have heretofore been used in the score-forming art. The thickness of the sheet material can vary and it has been found suitable to employ thicknesses of about 7 to about 27 mils when using sheet material of the polyethylene and polypropylene type, for example.

The drawings further illustrate the method and apparatus for carrying out the invention in the best mode presently contemplated.

Figure 1:
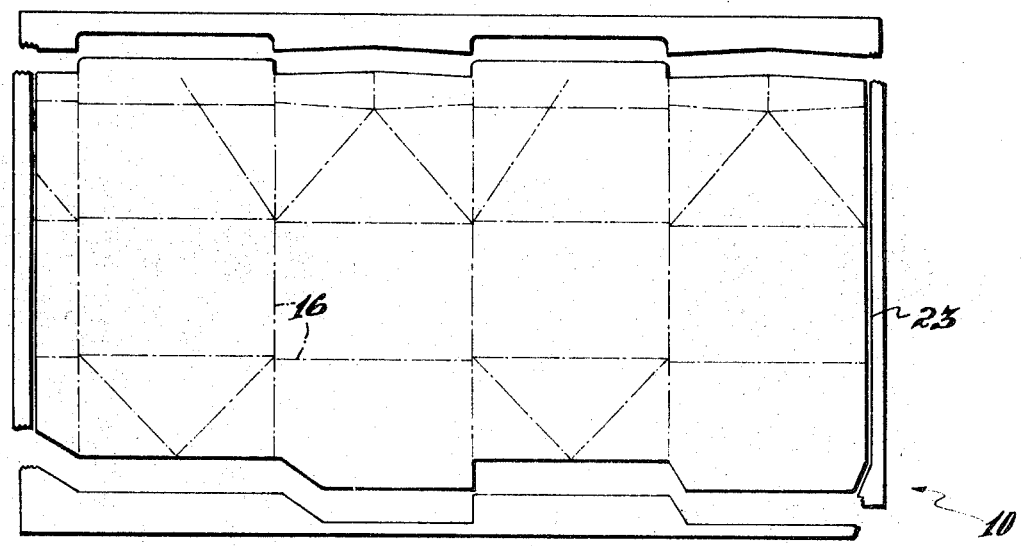
FIG. 1 is a flat view of a blank of synthetic plastic sheet material cut and scored according to this invention.
Figure 2:
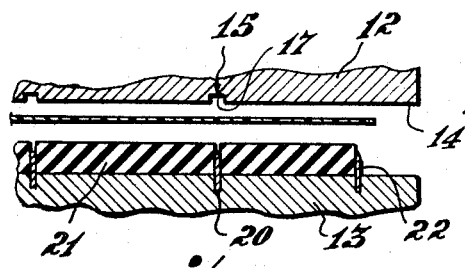
FIG. 2 is a simplified, fragmentary cross-sectional view of apparatus according to this invention with plastic sheet material interposed and ready for cutting and scoring the blank as shown in FIG. 1.
Figure 3:
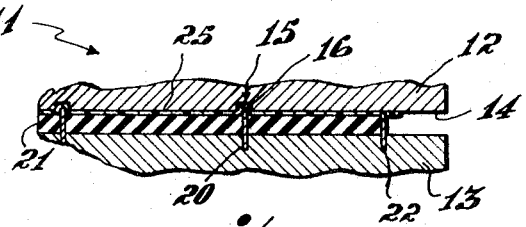
FIG. 3 is a view similar to FIG. 2 with the apparatus in score-forming relation for cutting and scoring.
Figure 4:
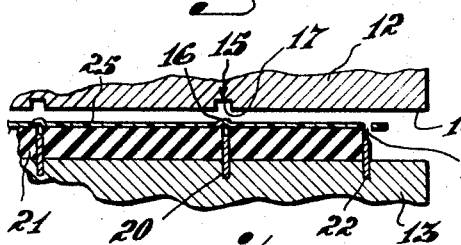
FIG. 4 is a view of the apparatus of FIG. 3 after the sheet material has been cut and scored.

Referring to FIG. 1, a synthetic plastic sheet material 10 is shown, cut and scored from a piece of stock material using apparatus 11 of this invention as shown in FIGS. 2–4. The apparatus 11 includes a female die member 12 and a male scoring member 13 movable relative to one another into score-forming relation by suitable means not shown. These members 12 and 13 can be relatively planar die platens or platens having an arcuate contour as conventionally provided in the rotary die cutting and scoring art. The female die member 12 has a metal or rigid surface 14 with a slot 15 formed therein defining a score line 16 to be formed in the synthetic plastic sheet 10. The slot 15 with bottom 17 is adapted for receiving the male scoring member 13 during score-forming.

The male scoring member 13 has mounted thereon metal or rigid scoring rules 20 and a resilient material 21 substantially surrounding the rules. The scoring ends of rules 20 are adapted for score-forming cooperation with the bottoms 17 of female slot 15. Also, a cutting blade 22 is mounted on the male member for cutting the sheet stock during score-forming. As shown, the resilient material 21 extends above the ends of scoring rule 20 and blade 22; and has sufficient resiliency for compression below these ends when the members 12, 13 are brought into score-forming relation. The resilient material 21 extends above the end of rule 20 to a height of about several mils depending upon the depth of the score to be made, the sheet material being scored and its thickness, and the resiliency of the material 21 being used. The resilient material 21 is adapted to frictionally engage and immobilize the sheet material between the members 12, 13 in those areas bordering the slot 15.

When a blank is formed as shown in FIG. 1, male scoring rules 20 and blade 22 are shaped and located to provide the scored lines 16 and cut end 23 of sheet material 10. In the complete apparatus (not shown) for forming a blank, the resilient material 21 substantially surrounds the scoring rules 20, completely between rules 20 and blade 22, for sufficient immobilization of the plastic material in the unscored areas between members 12 and 13.

Figure 5:
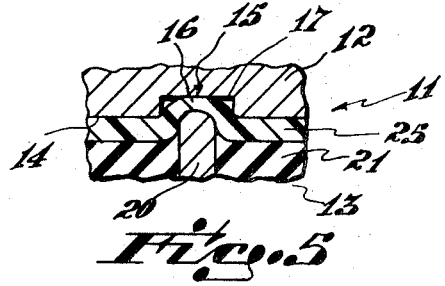
FIG. 5 is an enlarged fragmentary view of a scored area shown in FIG. 3.

In carrying out the process according to this invention, a synthetic plastic sheet material of the semi-rigid polyolefin type is interposed between the male and female members 12, 13. For example, a polyethylene sheet material having a thickness of about 15 mils is introduced between the members 12, 13 and then they are moved into score-forming relation to cause the resilient material 21 to frictionally engage and sufficiently immobilize the plastic sheet material under compression against female surface 14 in those areas bordering slot 15. In forming the blank of FIG. 1, the sheet material in the unscored areas 25 or areas between scores or cuts and scores is sufficiently immobilized completely between rules 20 and blade 22 and surrounding the borders of the female slot 15. Then, the scoring rule of the male member 12 is introduced into slot 15 to locally stretch the sheet material while the resilient material 21 substantially maintains the sheet material in the immobilized areas against stretching to score the plastic (shown best in FIG. 5). FIG. 5 illustrates the bottom technique embodiment of this invention where the ends of rules 20 cooperate with the slot bottom 17 to contact or press the plastic therebetween which is presently preferred for the reasons discussed above. During scoring, the blade 22 cuts the sheet material. The members 12, 13 are then separated, the resilient material recovers its form and the blank is removed.

As shown in FIG. 5, this apparatus and method produces a well-defined score which is oriented at its apex. This "bottom technique" gives a sharper score line probably due to the stretched plastic being compressed at about its apex with redistribution or shaping of the plastic to render it much more foldable. This shaping of the score exterior (i.e., illustrated in FIG. 5 as tending to "flatten" the score apex at slot bottom 17) also prevents nesting with score interior (adjacent male rule) of slightly different shape when blanks are stacked. In this connection, such a well-defined score is obtainable with thicknesses of sheet material of about ½ of the difference between the width of the slot and the width of the scoring rule. Score height is controlled by predetermining the depth of the slot for coaction with the scoring rule end. It has been found, for example, with polyethylene sheet of about 15 mils in thickness to preferably provide a slot depth which furnishes a score height of about 6 to about 9 mils (as measured between the flat, unscored surface of sheet side adjacent the female surface to the apex of the score). In the "bottomless technique" it is also desirable to achieve score heights of about 6 to 9 mils for about 15 mil polyethylene sheet thicknesses as in the "bottom technique." It has been observed that as score height increases in the bottomless technique for this same type sheet material to about 15 mils or above that the score lines are less sharp and this excessive height promotes nesting between scored blanks. The latter is probably due to better conformance between the external a dninternal score apexes of stacked blanks which tends to enhance sticking.

FIG. 5 also shows the score occurring locally in the area of the sheet material defining the score lines while the major flat areas of the sheet were restrained from movement during the scoring action. As mentioned, this provides a relatively flat blank which is not bubbled and does not have accumulations of plastic material at the hinges adjoining the scored areas.

Resilient material which has been found suitable to frictionally engage and immobilize the sheet material between the female and male scoring members is of the elastomeric or rubber-like type. One form of material includes a cork-rubber or elastomeric composition having a hardness of about 233–237 as measured by the Pusey and Jones method. The frictional engagement of the resilient material with the synthetic plastic sheet which is being scored is such that the sheet is sufficiently immobilized in the unscored areas against stretching. Therefore, the coefficient of friction to achieve this type of immobilization will vary depending upon the resilient material and the synthetic plastic sheet being scored. It has been found that cork-rubber composition of the above hardness having a coefficient of friction of about 0.65 to be suitable with polyethylene sheet material. This coefficient of friction was determined by a spring scale sled measurement of sliding friction in which force applied was about 25 lbs. per sq. in. The coefficient of friction was determined by the ratio of the force required to move the polyethylene sheet material over the cork-rubber material to the total force pressing the two together according to the formula $k=F/W$; where F is the force required to move one surface over the other and W is the force pressing the surfaces together.

It is to be understood that there are other modes of carrying out the invention which are within the boundaries of this description and the skill of the art; and having described the presently preferred mode and apparatus, the invention is not to be limited thereto.

What is claimed is:

1. A process for scoring a synthetic plastic sheet material which comprises:

providing male and female die members movable into and out of score-forming relation with one another, said male member having a scoring rule and a resilient material substantially surrounding said rule, said resilient material extending above the scoring end of the rule and having sufficient resiliency for compression below the end when said members are brought into score-forming relation, said female member having a surface with a slot for receiving said rule when said members are moved into score-forming relation, interposing the plastic sheet material between said die members, moving said members into score-forming relation to cause said resilient material to frictionally engage and sufficiently immobilize the plastic sheet material under compression against said female surface in those areas bordering said slot, introducing the scoring rule into the slot to stretch the sheet material thereinto while substantially maintaining said sheet material in the immobilized areas against stretching to score the plastic sheet, and separating said members to recover the scored sheet.

2. The process according to claim 1 wherein said sheet material is a semi-rigid polyolefin plastic.

3. The process according to claim 2 wherein said polyolefin plastic is an aliphatic polymer selected from the group consisting of polyethylene and polypropylene of about 7 to about 27 mils in thickness.

4. The process according to claim 1 wherein the thickness of said sheet material is about ½ of the difference between the width of said slot and the width of said scoring rule.

5. A process according to claim 1 wherein said male member also has a cutting blade which cuts the sheet material when said members are moved into score-forming relation.

6. The process according to claim 1 which includes providing said female slot with a bottom and which further includes the step of contacting the stretched sheet material between the end of said scoring rule and the slot bottom.

7. A process for forming a flat, unbubbled container blank of semi-rigid synthetic plastic material having a plurality of score lines of predetermined configuration for folding therealong in setting up the container which comprises:

providing male and female die members movable into and out of score-forming relation with one another, said male member having rigid scoring rules corresponding to said plurality of score lines, said female member having a rigid surface with slots for receiving said rules when said members are moved into score-forming relation, interposing a stock piece of said sheet material between said die members, moving said members into score-forming relation, immobilizing said sheet material between said male and female members and against said female rigid surface in those areas bordering said slots, introducing the scoring rules into said slots to stretch the sheet material thereinto while substantially maintaining said sheet material in the immobilized areas against stretching to score the plastic sheet, contacting the stretched material between the ends of said scoring rules and the slot bottoms, and separating said members to recover the scored blank.

8. The process according to claim 7 wherein said sheet material is a semi-rigid polyolefin plastic of about 15 mils in thickness and said stretched material height is controlled at about 6 to about 9 mils.

9. The process according to claim 7 wherein said sheet material is a semi-rigid polyolefin plastic.

10. The process according to claim 9 wherein said polyolefin plastic is an aliphatic polymer selected from the group consisting of polyethylene and polypropylene of about 7 to about 27 mils in thickness.

11. The process of claim 7 which includes the additional step of cutting said stock piece to form said blank.

12. The process of claim 11 wherein blanks are produced having overall dimensional tolerances maintained within a precision on the order of about ±0.005 inch.

References Cited

UNITED STATES PATENTS

| | | | |
|---|---|---|---|
| 608,963 | 8/1898 | Heeren | 264—292X |
| 2,518,565 | 8/1950 | Nicolle | 264—292X |
| 3,058,154 | 10/1962 | Howard | 264—163X |
| 3,067,806 | 12/1962 | Trelease | 264—291X |
| 3,220,544 | 11/1965 | Lovell | 264—292X |
| 3,332,136 | 7/1967 | Bish | 264—163X |
| 3,367,998 | 2/1968 | Osterrieth | 264—294X |
| 3,470,290 | 9/1969 | Poris | 264—291 |
| 3,470,291 | 9/1967 | Johnson | 264—292 |
| 3,437,726 | 4/1969 | Hagmann | 264—323 |
| 3,439,078 | 4/1969 | Whiteford | 264—88 |

ROBERT F. WHITE, Primary Examiner

R. R. KUCIA, Assistant Examiner

U.S. Cl. X.R.

264—292, 316